United States Patent [19]

Chaux et al.

[11] Patent Number: 4,548,734

[45] Date of Patent: Oct. 22, 1985

[54] WATER SOLUBLE GUM/POLYMER COMPOSITIONS AND HYDROSOLS PREPARED THEREFROM

[75] Inventors: Jean-Bernard Chaux; Pierre Gagne, both of Tassin la Demi-Lune; Michel Garcia, Antony; Dominique Lespinasse, Jassans Riottier; Josiane Roussos, Neuilly sur Seine, all of France

[73] Assignee: Rhone-Poulenc Specialites Chimiques, Courbevoie, France

[21] Appl. No.: 460,772

[22] Filed: Jan. 25, 1983

Related U.S. Application Data

[63] Continuation of Ser. No. 442,003, Nov. 16, 1982, abandoned.

[30] Foreign Application Priority Data

Nov. 16, 1981 [FR] France .................................. 81 21359

[51] Int. Cl.$^4$ .......................... B01F 3/18; B01J 13/00; C08J 3/06; C08L 5/00
[52] U.S. Cl. .................................... 252/311; 106/208; 106/209; 252/310; 252/363.5; 524/847
[58] Field of Search .................. 252/311, 363.5, 310; 106/209, 208; 524/847

[56] References Cited

U.S. PATENT DOCUMENTS

| | | | |
|---|---|---|---|
| 2,127,770 | 8/1938 | Franz et al. | 252/311 X |
| 2,376,656 | 5/1945 | Buchanan | 252/363.5 |
| 2,678,280 | 5/1954 | Noyes et al. | 106/209 X |
| 2,768,143 | 10/1956 | Henry | 252/363.5 |
| 3,297,583 | 1/1967 | Dierichs et al. | 252/363.5 |
| 3,637,564 | 1/1972 | Economou | 252/363.5 X |

*Primary Examiner*—Richard D. Lovering
*Attorney, Agent, or Firm*—Burns, Doane, Swecker & Mathis

[57] ABSTRACT

Compositions of matter, desirably in powder form, adapted for ready dispersion/dissolution in an aqueous medium, and which rapidly provide maximum viscosity values therefor, are comprised of an intimate admixture of a water soluble gum or polymer, a dispersion/dissolution enhancing amount of a water donor material, and, advantageously, an anionic and/or nonionic surfactant.

25 Claims, No Drawings

# WATER SOLUBLE GUM/POLYMER COMPOSITIONS AND HYDROSOLS PREPARED THEREFROM

CROSS-REFERENCE TO RELATED APPLICATIONS

This application is a continuation of our copending application, Ser. No. 442,003, filed Nov. 16, 1982, and now abandoned. Cf. our copending application, Ser. No. 442,004, and Le Du et al copending application, Ser. No. 442,002, both filed concurrently herewith and both assigned to the assignee hereof, and both now abandoned.

BACKGROUND OF THE INVENTION

1. Field of the Invention

The present invention relates to novel compositions of matter comprised of water soluble gums, to process for the preparation thereof, and to the utilization of such compositions in the preparation of various hydrosols therefrom. More especially, this invention relates to such compositions comprised of the water soluble natural, modified natural or synthetic gums.

In the description which follows, the following definitions are employed:

(i) Gum: any polymer material that may be dissolved or dispersed in water to yield aqueous solutions or dispersions designated "sols";

(ii) Natural gum: natural polymer gums of animal or vegetable origin;

(iii) Modified natural gums: polymer gums obtained by modification of the chemical structure of natural polymer gums;

(iv) Synthetic gums: polymer gums obtained entirely by chemical synthesis.

2. Description of the Prior Art

Certain of the aforesaid gums, by virtue of their viscosity and rheology, are useful in numerous fields of application as varied as construction, painting, paper, textiles, cosmetics, petroleum exploitation, the food industry, water treatment, phytosanitation, etc.

For many applications, it is necessary to convert the gum to the form of an aqueous solution thereof. However, it is a disadvantage of most of the water soluble gums that they are difficult to solubilize. Under the effect of excessively rapid hydration, the particles in contact with water are surrounded with a thin gelatinized film and agglomerate. These agglomerates or floccules, surrounded by partially swollen polymers on the surface thereof, disintegrate and dissolve only with difficulty.

It has been proposed to improve the dispersibility of a synthetic polymer of acrylic copolymer type by surface treating same with solutions of aluminum, chromium, zinc, manganese, barium, tin or zirconium salts in a non-solvent for the polymer, then evaporating the solvent and drying the resultant powder (French Pat. No. 2,310,156).

This prior art process, however, requires a special treatment of the gum to enable the dispersion thereof. Serious need thus exists for improved means to facilitate the dissolution of the gums that are difficult to disperse.

SUMMARY OF THE INVENTION

Accordingly, a major object of the present invention is the provision of improved means for accelerating the dispersion of gums in water and to increase the rate of dissolution thereof and thereby increase the speed of obtainment of high viscosities in the product solutions, by compounding certain additives therewith, while at the same time preserving the rheological properties of the gum.

Another object of the invention is the provision of the subject gums in a readily manipulated powder form, which dissolves well and swells rapidly in water.

Yet another object of the invention is to provide for the aforesaid desiderata by presenting the gum in the form of powdery compositions having the highest content of the active substance.

Briefly, the present invention features compositions of matter comprised of water soluble gums, which compositions are adapted to facilitate dissolution of the gum components thereof by having incorporated therein, or also being comprised of, a material adapted to introduce water thereto, or "water donor", or a material adapted to absorb and retain water from an external aqueous environment.

DETAILED DESCRIPTION OF THE INVENTION

More particularly according to this invention, it has now unexpectedly been found that compounding a water soluble gum with an additive adapted to introduce a dispersion enhancing amount of water into the subject compositions, gives rise to an increase in the rate of dissolution of the gum in water.

Generally speaking, this invention relates to the dissolution in water of a wide variety of water soluble gums, such as the natural gums, modified natural gums, synthetic gums, or admixtures thereof.

The natural gums are materials widely described in the literature [R. L. Whistler, *Industrial Gums, Polysaccharides and Their Derivatives*, 2nd Edition, Academic Press (1973)].

Among the vegetable gums suitable for use in the compositions according to this invention, the following are representative:

(i) Seaweed gums: agar-agar, algins and alginates, carrageenin, fucoiden, laminarin;

(ii) Vegetable exudate gums: gum arabic, ghatti gum, karaya gum, gum tragacanth;

(iii) Vegetable seed grain gums: carob gum, linseed, tamarind, guar gum, tara;

(iv) Vegetable extract gums: pectin;

(v) Starches and dextrans.

As regards the gums of animal origin, gelatin and casein are representative, and more particularly the caseinates. For a more complete description of these gums, reference is made, for gelatin, to Martin Glicksman, *Gum Technology in the Food Industry*, page 359, Academic Press (1969).

From among the aforesaid gums, the natural gums are the preferred and more preferred are agar-agar, alginates, carrageenin, gum arabic, gum tragacanth, karaya gum, carob gum, guar gum, pectin, and gelatin.

Agar-agar is extracted from red seaweed (*Gelidium sp.*) by means of boiling water. It is a linear galactan sulfate: an alternating copolymer of $\beta$-D-galactopyranose ($\beta 1 \rightarrow 4$ bond) and anhydro-3,6-$\alpha$-L-galactopyranose ($\alpha 1 \rightarrow 3$ bond) bearing a small number of sulfate groups.

Algin is a polysaccharide found in brown seaweed (*Macrocystis pyrifera-Laminaria digitata*). The most common algin is sodium alginate which is a high molecular weight, linear polymer comprising recurring units of β-D-mannopyranosyluronic acid (1→4 bond) and α-L-gulopyranosyluronic acid (1→4 bond).

Carrageenins originate in red seaweed (*Chondrus crispus, Gigartina stellata*) and are mixtures of polysaccharides which may be fractioned into kappa-, lambda-, iota-carrageenates. Carrageenates contain the following predominant units: 4-sulfate-D-galactose (1→3 bond) and 3,6-anhydro-D-galactose (1→4 bond), for kappa-carrageenate; 2,6-disulfate-D-galactose (1→4 bond) and 2-sulfate-D-galactose (1→3 bond) for lambda-carragenate; 4-sulfate-D-galactose (1→3 bond) and 2-sulfate-3,6-anhydro-D-galactose (1→4 bond) for iota-carrageenate.

Gum arabic is produced by trees belonging to the acacia family (*Acacia sp.*). It is a colloid having a branched structure still not completely elucidated. The principal chain consists of D-galactopyranose connected by β(1→6) and β(1→4) bonds; it bears side chains of D-galactopyranose, arabinose, rhamnose and glucuronic acid attached by means of 1→3 bonds. Its molecular weight ranges from 200,000 to 300,000.

Gum tragacanth, originating in *Astragalus gummifer*, is substance with a complex structure comprising two fractions: one consisting of galacturonic acid, arabinose and xylose, the other of polymethoxy acids. It has a high molecular weight (on the order of 840,000).

Karaya gum is the dried exudate of the tree, *Stercula urens*. It consists of partially acetylated uronic acids, rhamnose, galactose and other -oses; its molecular weight is on the order of 1,000,000.

Carob gum originates in the seeds of *Ceratonia siliqua*. It is a galactomannane with a molecular weight of approximately 310,000, consisting essentially of a straight polymer of D-mannose (1→4 bond) with side chains each consisting of a galactose residue on each of the four or five mannose groups attached by 1→6 bonds.

Guar gum is derived from *Cyamopsis tetragonolobus* of the legume family. Its average molecular weight ranges from 200,000 to 300,000. Its structure is similar to carob gum and differs only in that the number of lateral G-galactose chains is greater.

Pectin is found mainly in cell walls and the intercellular spaces of vegetable tissues. The commercial source of pectin is cedrat-albedo wastes. Pectin may be considered a linear polymer of galacturonic acid, with a greater or lesser amount of the carboxyl groups thereof being esterified by methyl radicals. Pectins are classified as a function of their content in methoxy —O—CH$_3$ groups. Thus, pectins are distinguished as being of high (H.M.) methoxy group type (70% or more of the carboxyl groups esterified) or as pectins of low (L.M.) methoxy group type (less than 50% of the carboxyl groups are esterified). The molecular weight of the pectins varies widely from 1,000 to 100,000 and varies as a function of the length of the chain, which may contain from several units to several hundred units of galacturonic acid.

Modified natural gums are also suitable for use according to this invention. This class of gums is illustrated by cellulose derivatives, such as methylcellulose, ethylcellulose hydroxyethylcellulose, hydroxypropylcellulose, ethylhydroxyethylcellulose, sodium carboxymethylcellulose, sodium carboxymethylhydroxyethylcellulose, natural starches modified by fractioning amylose and amylopectin, by cross-linking effected with difunctional reagents of epichlorohydrin type, the anhydride of linear dicarboxylic acids, formaldehyde, and the like, by treatment with enzymes, acids, bases and/or heat, by starch derivatives obtained by substituting a certain proportion of the hydroxyl groups thereof with acetate, hydroxyethyl, hydroxypropyl, sulfate, and phosphate groups.

For a more detailed description regarding the modified natural gums, reference is also made to the R. L. Whistler and M. Glicksman texts, supra.

Finally, water soluble synthetic gums may be utilized in this invention. This family of polymers is very broad and to characterize same, recourse must be had to the literature, for example, the works of Robert L. Davidson and Marshall Sittig, *Water-Soluble Resins*, 2nd edition, Reinhold Book Corp. (1968), N. M. Bikales, *Water-Soluble Polymers*, Plenum Press (1973) and the encyclopedia Kirk-Othmer, *Encyclopedia of Chemical Technology*.

Vinyl, acrylic, and the ethylene oxide polymers, and the copolymers and derivatives thereof, are within this category.

More precisely, the following polymers and derivatives thereof are representative: polyvinyl alcohols, polyvinylpyrrolidones, polyvinyl methyl ethers, polyacrylic and polymethacrylic acids, their salts or esters, polyacrylamides and polymethacrylamides, ethylene oxide polymers, and the like.

All of the foregoing synthetic gums or synthetic water soluble polymers are per se known, commercial products. A representative preparation of such polymers is set forth below, without intending the invention to be limited to the particular polymers obtained by the exemplary processes described.

Polyvinyl alcohol is marketed in four molecular weight ranges: low molecular weight—25,000 to 35,000; intermediate molecular weight —120,000 to 150,000; high molecular weight—170,000 to 220,000; very high molecular weight—250,000 to 300,000. The invention principally relates to polymers having high and very high molecular weights which are difficult to solubilize. The alcohols are prepared from polyvinyl acetate obtained from vinyl acetate monomer, by alcoholysis.

The polymerization of vinyl acetate is effected by conventional methods, in mass or in layers.

The polyvinyl acetate polymer is then dissolved in a solvent, typically methanol, and then subjected to alcoholysis by means of acid or basic catalysis. Polyvinyl alcohol, which is insoluble in methanol and in methyl acetate, a by-product of the process, precipitates and is then filtered, washed and dried.

Polyvinylpyrrolidones are synthesized by mass polymerization in solution or in suspension in the vinylpyrrolidone monomer. The polymerization may be catalyzed ionically by boron trifluoride, potassium amide or by free radical catalysts, such as hydrogen peroxide, benzoyl peroxide, azobisisobutyronitrile.

Acrylic acids and derivatives thereof may be polymerized in mass, in aqueous or organic solution, in emulsion or in an aqueous dispersion. In any case, the polymerization is effected by means of a polymerization initiator, which may be an anionic, organometallic initiator or a free radical produced by heat treatment, by a redox system, or by the effects of radiation.

The polymerization of acrylic or methacrylic acid in solution may be conducted in water by heating the monomer in the presence of initiators, such as hydrogen peroxide, potassium persulfate, acetyl peroxide or by polymerizing the monomer at a lower temperature between 50 and 100° C., while initiating the reaction with a potassium persulfate and sodium thiosulfate redox system.

A similar polymerization in aqueous solution may be conducted by irradiating the aqueous solution with ultraviolet radiation.

It is also possible to carry out the polymerization in organic solvents, such as methanol, dioxane in the presence of azobisisobutyronitrile and at a higher temperature, or in solvents such as benzene, n-hexane, with benzoyl peroxide as the initiator, at elevated temperatures, to produce an insoluble polymer which is separated from the reaction medium by filtration.

Salts of acrylic and methacrylic acid may be polymerized in an aqueous medium in the presence of initiators, but most often the salts of polyacrylic acids and of the homologs thereof are prepared by neutralizing the corresponding polymer with an organic or inorganic base.

A homopolymer may also be prepared from aminoalkyl acrylates and methacrylates, optionally quaternized. Generally, same are employed in the form of their chlorides and polymerized in aqueous solution under the same conditions as for acrylic acid.

Acrylamide polymers may also be used; same include a large class of monomers, acrylamide, methacrylamide and all of the N-substituted derivatives thereof.

Acrylamide polymerizes in aqueous solution with free radical initiators, such as t-butyl hydroperoxide, hydrogen peroxide, alkali metal or ammonium persulfates, chlorates, perborates, percarbonates, and the like. Redox systems of ammonium persulfate and potassium metabisulfate type are used to polymerize at low temperatures and to obtain high molecular weights. Industrially, polymerization is conducted in a solution with 30–60% of the monomer, at a temperature of 30–60° C., by using a catalyst representing 0.01 to 10% by weight of the monomer, at a pH between 3 and 6. Polymerization takes 3 to 6 hours. The polymer is converted to a powder by conventional methods: atomization or precipitation with lower alcohols.

It too is possible to polymerize acrylamide by using other initiators, e.g., azo compounds, photochemical systems, X-rays, ultraviolet rays, etc.

Among the polymers of ethylene oxide, the invention especially relates to those of high molecular weight, i.e., a molecular weight in excess of 100,000.

The polyoxyethylenes are obtained by the polymerization of ethylene oxide in the presence of catalysts such as alkaline earth metal oxides and carbonates, hydrates of ferric chloride, bromide and acetate, and the alkyl and alkyloxy compounds of aluminum, zinc, magnesium and calcium.

In addition to the foregoing homopolymers, it is also envisaged to employ soluble copolymers prepared by copolymerization of hydrophilic monomers. For example, representative copolymerizations include those with the comonomers maleic anhydride, itaconic acid, acrylamide, methacrylamide, acrylonitrile or methacrylonitrile, acrylic and methacrylic acids, the salts and esters thereof, aminoalkyl acrylates and methacrylates, optionally quaternized, methyl ether and vinyl ether, and the like.

The polymers or copolymers which may be employed in the compositions of the invention thus may be highly diverse in nature, just so long as they are soluble in an aqueous medium.

Particularly suitable for use in the invention are the polymers or copolymers of acrylic compounds, such as acrylamide, methacrylamide, acrylic acids and the salts or esters thereof, aminoalkyl acrylates and methacrylates, optionally quaternized, and which are prepared by the process described in French Pat. No. 2,348,227 which comprises:

(i) continuously depositing, in a thin layer, onto a support, an aqueous solution of an acrylic monomer containing a photopolymerization promoter, in particular benzoin and its methyl, ethyl, or isopropyl ethers, in a proportion of 0.005 to 1% by weight with respect to the monomer, preferably 0.01 to 0.5%, by weight, said solution containing less than 1 mg oxygen per liter of solution, preferably less than 0.5 mg/l;

(ii) exposing the thin, liquid layer to irradiation having wave lengths between 300 and 450 m$\mu$, preferably 330 and 400 m$\mu$, for a period from 1 to 20 min, preferably 3 to 7 min, the average energy of active radiation being between 20 and 300 watts/m$^2$, with the gaseous atmosphere enveloping the solution exposed to photopolymerization having an oxygen content of less than 5% by volume, preferably less than 0.5%, the support being cooled to dissipate the heat generated by the polymerization;

(iii) maintaining the thin layer subjected to the initial photopolymerization in the aforesaid step (ii) on said cooled support and under the oxygen-free atmosphere, and then exposing it to a second irradiation with wave lengths of 300 and 450 m$\mu$ for a period from 1 to 20 min, preferably 3 to 10 min, the average energy of this second irradiation being greater than 300 and less than 2,000 watts/m$^2$; and (iv) removing the thin solid layer obtained in this manner from the support and exposing same in air to irradiation with wave lengths between 300 and 450 m$\mu$, preferably 330 and 400 m$\mu$, for 30 min to 3 hours, preferably 40 min to 90 min, with the average energy of active radiation being 20 to 500 watts/m$^2$.

The water donor component of the subject compositions, or material providing the required fraction of water, is comprised of either bound water, or sorbed water, or water of crystallization. The first category of materials includes hydrated silica and alumina, either alone or in admixture, in a natural or synthetic form.

Thus, finely precipitated silica, in the form of fine particles having a large surface area, may be used. More particularly, silica particles having a BET surface ranging from 200 to 400 m$^2$/g are employed, [the BET surface is determined by the method of Brunauer-Emmett-Teller, described in *Journal of the American Chemical Society*, 60, page 309 (February 1938)]. The ultimate particle size of the silica varies from 200 to 800 Å.

Further, hydrated silica gels are also suitable for use in the invention, in particular the following three principal types of gels: gels having a BET surface of 750–800 m$^2$/g, a pore volume of 0.37–0.40 cm$^3$/g, and an average particle diameter of 22–26 Å; gels having a BET surface of 300–350 m$^2$/g, a pore volume of 0.9–1.1 cm$^3$/g, and an average particle diameter of 120–160 Å; and gels having a BET surface of 100–200 m$^2$/g, a pore volume of 1.4–2.0 cm$^3$/g, and an average particle diameter of 180–220 Å.

Also useful consistent herewith are the dehydrated silica gels having a BET surface of 10 to 500 m$^2$/g and a pore volume of 0.5 to 1.1 cm$^3$/g, with an average pore diameter ranging from 30 to 3,000 Å, preferably 600 to 3,000 Å. An autoclave treatment, described in French Pat. No. 2,093,176, enables providing the silica with the surface desired.

The water donor may also be an alumina hydrate in either of two states of hydration: $Al_2O_3.3H_2O$ and $Al_2O_3.H_2O$. Same may be employed in their natural form: hydrargillite or gibbsite, bayerite, nordstrandite, boehmite, diaspore; or in their synthetic form. Dried alumina gels of the boehmite type, having a surface of 200 to 400 $m^2/g$ and pore diameters of 50 to 100 Å, or various commercial products, in particular the α-trihydrate obtained via the Bayer process and having spheroidal particles with dimensions of 20 to 150 microns, too may be used.

All of the aforesaid compounds are products per se known to the art and are described, for example, in the Kirk-Othner encyclopedia, *Encyclopedia Of Chemical Technology*, Volume 2.

Also useful are the hydrated silica aluminates in the form of argillas, or natural or synthetic zeolites.

Exemplary of the argillas suitable for use according to this invention, those belonging to the following groups are representative:
(i) Kaolin type: kaolinite, dickite, nakrite, anauxite, halloysite, endelitte;
(ii) Serpentine type: chrysolite, amesite, cronstedite, chamosite, garnierite;
(iii) Montmorillonite type: montmorillonite (bentonite), beidellite, nontronite, hectorite, saponite, sauconite;
(iv) Vermiculite or chlorite type; and
(v) Attapulgite or sepiolite.

Representative natural zeolites are analcime, harmotome, phillipsite, gismondine, laumontite, erionite, offretite, levynite, faujasite, chabazite, gmelinite, natrolite, scolecite, mesolite, thomsonite, edingtonite, mordenite, ferrierite, epistilbite, heulandite, clinoptilolite, stilbite, brewsterite. Preferably, faujasite or mordenite is utilized.

Exemplary of the synthetic zeolites, the following commercial zeolites are representative: zeolites of type A, X, Y, L and those reproducing the structure of mordenite, chabazite and erionite.

The zeolites X and Y typically have a BET surface of 800 $m^2/g$ and a pore volume, respectively, of 0.36 $cm^3/g$ and 0.34 $cm^3/g$.

The zeolites of type A, particularly of type 4A, have a BET surface of less than 10 $m^2/g$ and a pore volume of 0.30 $cm^3/g$.

For a detailed description of hydrated silica aluminates, reference is made to the literature: for example, for the argillas, to Kirk-Othmer, *Encyclopedia of Chemical Technology*, Volume 5, and for the natural and synthetic zeolites, to D. W. Breck, *Zeolite Molecular Sieves*, A. Wiley-Interscience Publications (1974).

Also intended as water donors or materials incorporating water into the subject compositions are the hydrates of various inorganic or organic metal salts, in particular the alkali or alkaline earth metal salts.

More specifically, hydrates of the following salts or compounds, used either alone or in admixture or combination, may be used: carbonates, halides, nitrates, phosphates, silicates, sulfates, as well as the acetates, citrates, lactates, laurates and tartrates of sodium, potassium, calcium, magnesium, and the like.

As specific examples of the foregoing, the following are representative:
(1) Sodium acetate trihydrate: $NaC_2H_3O_2.3H_2O$
(2) Sodium carbonate heptahydrate: $Na_2CO_3.7H_2O$
(3) Sodium citrate pentahydrate: $Na_3C_6H_5O_7.5.5H_2O$
(4) Sodium orthophosphate dodecahydrate: $Na_3PO_4.12H_2O$
(5) Magnesium and sodium tartrate decahydrate: $Na_2Mg(C_4H_4O_6)_2.10H_2O$
(6) Sodium sulfate heptahydrate: $Na_2SO_4.7H_2O$
(7) Sodium sulfate decahydrate: $Na_2SO_4.10H_2O$
(8) Potassium and magnesium chloride hexahydrate: $KCl.MgCl_2.6H_2O$
(9) Potassium and magnesium sulfate hexahydrate: $K_2SO_4.MgSO_4.6H_2O$
(10) Calcium acetate dihydrate: $Ca(C_2H_3O_2)_2.2H_2O$
(11) Calcium carbonate hexahydrate: $CaCO_3.6H_2O$
(12) Calcium chloride hexahydrate: $CaCl_2.6H_2O$
(13) Calcium citrate tetrahydrate: $Ca_3(C_6H_5O_7)_2.4H_2O$
(14) Calcium lactate pentahydrate: $Ca(C_3H_5O_3)_2.5H_2O$
(15) Calcium nitrate trihydrate: $Ca(NO_3)_2.3H_2O$
(16) Calcium nitrate tetrahydrate: $Ca(NO_3)_2.4H_2O$
(17) Calcium sulfate dihydrate: $CaSO_4.2H_2O$
(18) Calcium tartrate tetrahydrate: $CaC_4H_4O_6.4H_2O$
(19) Magnesium acetate tetrahydrate: $Mg(C_2H_3O_3)_2.4H_2O$
(20) Magnesium chloride hexahydrate: $MgCl_2.6H_2O$
(21) Magnesium carbonate pentahydrate: $MgCO_3.5H_2O$
(22) Magnesium lactate trihydrate: $Mg(C_3H_5O_3)_2.3H_2O$
(23) Magnesium nitrate hexahydrate: $Mg(NO_3)_2.6H_2O$
(24) Magnesium orthophosphate octahydrate: $Mg_3(PO_4)_2.8H_2O$
(25) Magnesium sulfate heptahydrate: $MgSO_4.7H_2O$
(26) Magnesium tartrate pentahydrate: $MgC_4H_4O_6.5H_2O$
(27) Sodium carbonate decahydrate: $Na_2CO_3.10H_2O$ From among all of those water donors above outlined, finely divided silicas, capable of adsorbing 2 to 3 times their weight in water, are preferably selected.

It has also been determined that typically for the best results to be obtained consistent herewith, a third additive is included, such as a surfactant of the anionic and/or nonionic type.

A preferred embodiment of this invention is thus defined by a composition of matter comprising a water soluble gum/polymer having enhanced properties of dissolution, the same including, in addition to the water soluble gum or polymer, a material incorporating water into the composition, or water donor, or material adapted to sorb and retain water and an anionic and/or nonionic surfactant.

It too has now surprisingly been found that the compositions of the invention improve the dissolution of the water soluble gum or polymer to a degree increasing with the original degree of difficulty of dissolution of the gum or polymer.

For a description of the surfactants intended hereby, reference is made, for example, to Kirk-Othmer, *Encyclopedia Of Chemical Technology*, Volume 19, or to the different volumes in the series, *Surfactant Sciences Series* Marcel Dekker, Inc.; Vol. 1: *Nonionic Surfactants*, by Martin J. Schick; Vol. 7: *Anionic Surfactants*, by Warner M. Linfield; or the work by McCutcheons: *Detergents and Emulsifiers*, International and North American Edition.

As examples of the anionic surface active agents that may be used, the following are representative:
(i) soaps of alkali metals, such as the sodium or potassium salts of saturated or unsaturated fatty acids having 8 to 24 carbon atoms, preferably having 14 to 20 carbons, or aminocarboxylic acid derivatives, such as sodium N-lauryl sarcosinate, sodium N-acylsarcosiante, and the like;
(ii) alkali sulfonates such as the alkyl sulfonates, aryl sulfonates or alkylaryl sulfonates; in particular alkyl sulfonates, such as, for example, the diesters of sulfosuccinic acid, such as sodium diethylhexylsulfosuccinate, sodium dioctylsulfosuccinate, alkylbenzenesulfonates of the formula $R_1-C_6H_4SO_3M_1$ wherein the radical $R_1$ is a linear or branched chain alkyl radical containing 8 to 13 carbon atoms, such as, for example, a nonyl, dodecyl or tridecyl radical and $M_1$ represents a sodium atom, a potassium atom, an ammonium radical, diethanolamine or triethanolamine; alkylnaphthalenesulfonates of the formula $(R)_{no}C_{10}H_{7-no}SO_3M_1$ wherein $no$ is a number ranging from 1 to 3 and the radical R is a linear or branched chain alkyl radical containing 1 to 4 carbon atoms, such as, for example, a methyl, isopropyl or isobutyl radical and $M_1$ is as above-defined; other sulfonates may also be employed, such as N-acyl, N-alkyltaurates of the formula $R_2-CO-N(R_2')-CH_1-CH_2-SO_3Na$ wherein $R_2$ is an alkyl radical having 11 to 18 carbon atoms and $R_2'$ is a methyl or ethyl radical, such as, for example, sodium N-oleoyl-N-methyltaurate or N-palmitoyl-N-methyltaurate; olefin sulfonates resulting from the sulfonation of the linear olefin fractions, $C_{14}$ to $C_{18}$;

(iii) sulfates and sulfate products: among the alkyl sulfates having the formula $R_3OSO_3M_1$, representative are those wherein the $R_3$ radical is a lauryl, cetyl or myristyl radical and $M_1$ is as above-defined; natural sulfate oils and fats; the disodium salt of sulfated oleic acid; polyoxyethylene sulfate fatty alcohols of the formula $R_4(O-CH_2-CH_2)_{n1}OSO_3M_1$ wherein $R_4$ is an alkyl radical containing 6 to 16 carbon atoms, such as, for example, a myristyl radical or a linear or branched chain alkyl radical, such as, for example, a hexyl, octyl, decyl or dodecyl radical, $n_1$ is the number of mols of ethylene oxide and varies from 1 to 4 and $M_1$ is as above-defined; polyoxyethylene alkylphenol sulfates having the formula $R_5-C_6H_4(O-CH_2-CH_2)_{n2}OSO_3M_1$, wherein $R_5$ is a linear or branched chain alkyl radical containing 8 to 13 carbon atoms, such as, for example, an octyl, nonyl or dodecyl radical, $n_2$ is the number of mols of ethylene oxide and varies from 1 to 6 and $M_1$ is as above-defined;

(iv) alkaline phosphates: the mono- and diesters of orthophosphoric acid or one of its salts which may be represented, for the alkyl phosphates, by the formula $(R_6O)PO(OM_2)_2$ and, for the dialkyl phosphates, by the formula $(R_6O)_2PO(OM_2)$ wherein $R_6$ is a linear or branched chain alkyl radical having 6 to 12 carbon atoms and $M_2$ represents a hydrogen atom, or a sodium or potassium atom; as an example of the radical $R_6$, n-hexyl, n-octyl, n-ethylhexyl, dimethylhexyl, n-decyl, dimethyloctyl, trimethylheptyl and trimethylnonyl are noted; the mono- or diesters of orthophosphoric acid, or salt thereof, polyoxyethyleneated, which may be represented, for the polyoxyethylene alkyl phosphates, by the formula:

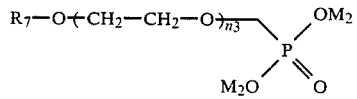

and, for the dialkyl polyoxyethylene phosphates, by the formula:

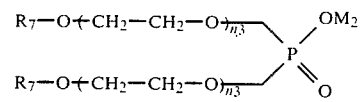

wherein $R_7$ represents a linear or branched chain alkyl radical having 6 to 12 carbon atoms, a phenyl radical, an alkylphenyl radical with the alkyl chain having from 8 to 12 carbon atoms, $n_3$ is the number of mols of ethylene oxide and varies from 2 to 8, and $M_2$ is as above-defined; as examples of the radical $R_7$, hexyl, octyl, decyl, dodecyl and nonylphenyl are representative.

Exemplary nonionic surfactants are the compounds obtained by condensation of an alkylene oxide with an organic compound, which may be aliphatic or alkylaromatic. Representative nonionic surfactants are:

(i) polyoxyethylene alkylphenols, for example, the products of the condensation of 5 to 25 mols of ethylene oxide per mol of alkylphenol, the alkyl radical of which being straight or branched chain and containing from 6 to 12 carbon atoms; in particular, nonylphenol condensed with approximately 10 to 30 mols of ethylene oxide per mol of phenol, dinonylphenol condensed with 15 mols of ethylene oxide per mol of phenol and dodecylphenol condensed with 12 mols of ethylene oxide per mol of phenol, are representative;

(ii) aliphatic polyoxyethylene alcohols resulting from the condensation of 5 to 30 mols of ethylene oxide with linear or branched chain fatty alcohols containing from 8 to 22 carbon atoms: for example, the product of condensation of approximately 15 mols of ethylene oxide with 1 mol of tridecanol or coprah alcohol; myristyl alcohol condensed with 10 mols of ethylene oxide;

(iii) fatty amides, such as, for example, the diethanolamide of fatty acids, or polyoxyethyleneated fatty acids, such as lauric acid or coconut oil;

(iv) polyoxyethylene and polyoxypropylene derivatives; illustrative of this type of surfactant are the well known products marketed under the trademark "PLURONICS". Same are obtained by the sequential addition of propylene oxide and ethylene oxide to a reactive hydrogen compound with a low molecular weight, such as, for example, propylene glycol.

In order to facilely incorporate the surfactant into the compositions of the invention, it is introduced in a solid, preferably powder form.

The surfactants are in the solid and, more frequently, in the liquid state. In the case of a liquid surfactant, it must first be deposited onto a powder support capable of sorbing and desorbing the liquid and which is chemically inert, insoluble or soluble. It may also be sorbed directly onto the powder consisting of the water donor, with water optionally being added thereto.

Preferably, a solid surfactant such as sodium alkylpropylnaphthalene sulfonate, in particular sodium diisopropylnaphthalene sulfonate, is utilized.

The proportions of the different components of the compositions of the invention are difficult to circumscribe in a general manner, because they depend upon the nature of the various components.

These proportions, however, are easily determined in each particular case by suitably varying the parameters.

For any given system of water soluble gum or polymer, water donor and surfactant, the different compositions are prepared by varying the weight ratios gum/water and of the water donor to water, with the surfactant content remaining constant, whereupon sols having a constant gum content (0.5%) are prepared.

The curve representing the variation in the viscosity of the sols is plotted as a function of the gum/water ratio. The gum/water ratio which permits the most rapid obtainment of the desired viscosity is then determined.

With the gum/water ratio determined, the ratio of the water donor to water is defined. This ratio is essentially a function of the adsorption coefficient of the water donor: it is necessary that the water donor lead to a powder and not to the formation of a paste.

Similarly, the optimum surfactant content of the composition is determined by plotting the curve expressing the variation in the viscosity of the sols as a function of the different surfactant contents, while maintaining the gum/water ratio constant.

In order to establish an order of magnitude, it will be appreciated that the proportions of the components may be selected within the following limits:

The water present in the subject compositions, expressed as the weight ratio gum/water, may vary over wide limits, from 6.5 to 1, preferably from 2.5 to 1.

The lower limit is not critical. In contrast, it is preferable that this ratio should not exceed 4.

The amount of water donor is defined as the ratio by weight of the water donor to water; it preferably ranges from 0.3 to 0.6, while it nonetheless may be selected within a larger range, from 0.3 to 2.6.

The amount of the surfactant employed, defined as the ratio of the weight of the surfactant to the total weight of the composition of the invention, may vary from 0 to 0.10. The upper limit is not critical, but there is no advantage in attaining weight ratios higher than 0.25. Preferably, the amount of surfactant is selected such that said ratio ranges from 0.03 to 0.07.

Examples of the subject compositions comprised of a water soluble gum are as follows:
(1) 30 to 70% by weight water soluble gum;
(2) 7 to 40% by weight of water donor;
(3) 0 to 10% by weight of an anionic and/or a nonionic surfactant; and
(4) 15 to 37% by weight of water.

Preferred compositions are the following:
(1) 50 to 60% by weight water soluble gum;
(2) 8 to 15% by weight of water donor;
(3) 3 to 7% by weight of an anionic and/or nonionic surfactant; and
(4) 24 to 36% by weight of water.

Concerning the preparation of the compositions according to the invention, it varies slightly depending on whether or not the water component of any given composition is externally added, or comprises water of crystallization, and depending on whether or not the surfactant is in the solid or liquid form.

The process for the preparation of the compositions according to the invention comprises mixing, in the dry state, the water donor, onto which water may be adsorbed, with the gum, and optionally adding thereto the anionic and/or nonionic surfactant.

The first operation, which features the impregnation of the water donor with water, entails the following materials: finely divided silica, dehydrated silica gels, alumina hydrates and silica aluminate hydrates. Progressively, under agitation, water is added to the water donor. This stage is omitted, if, as the water donor, hydrated silica gels or the hydrates of inorganic or organic salts are employed.

The water donor is in the form of a dry powder, even if it is impregnated with water, as aforesaid.

Subsequently, its admixture with the water soluble gum or polymer is effected in a powder mixer of known type: free-falling, drum type mixer, vertical or horizontal screw mixers, horizontal Lodige type mixer, or the like.

The introduction of the surfactant, if it is a solid, is effected into the mixture of the water donor and the gum/polymer.

If the surfactant is present in the form of a liquid, it is generally adsorbed onto the water donor, simultaneously with or successively to the adsorption of water, whereupon it is admixed with the gum/polymer.

After all of the components are introduced, the mixing is continued. The duration of the operation is a function of the apparatus used and is easily determined by those skilled in the art, such that a homogeneous mixture is obtained.

The process of the invention provides compositions in the form of a powder having excellent storage stability.

Also according to the invention, sols are prepared from the aforementioned compositions of matter.

The preparation of said sols is effected simply by adding the powdered composition to the aqueous medium under agitation, by means of conventional agitator devices (anchor agitation, screw or turbine agitation, etc.).

The introduction of the composition of the invention into the water may take place rapidly, in a single fraction, without difficulty. It does not require any special precautions.

The quantity of the composition introduced is such that, typically, the concentration of the water soluble gum in the sol varies from 0.3 to 10% by weight.

Agitation is then maintained until a constant viscosity results; usually, the duration of agitation ranges from 10 to 30 min.

By virtue of the formulation of a water soluble gum or polymer in the form of the compositions of the invention, marked improvement in the dissolution of the gum, together with an increase in the speed at which the viscosity of the resultant sol attains a maximum value, both ensue.

It will be seen that the sols obtained utilizing the compositions of the invention are perfectly stable under conventional storage conditions.

In order to further illustrate the present invention and the advantages thereof, the following specific examples are given, it being understood that same are intended only as illustrative and in nowise limitative.

In said examples to follow, those operating conditions set forth immediately below were utilized in each example for the formulation of the compositions according to the invention and for the preparation of the sols therefrom, except as otherwise stated.

The procedure employed for the formulation of the subject compositions was as follows:

(i) Water was sorbed, if necessary, onto the water donor, in the amount indicated. For this purpose, the water was slowly poured under mild agitation into a beaker containing said water donor;

(ii) The water soluble gum was then added to the water impregnated water donor, and same were then intimately admixed;

(iii) Finally, the solid surfactant was added thereto; and (iv) The resulting composition was homogenized for one hour in a powder mixer.

The conditions for the preparation of the sols were as follows; in each experiment, 400 g of sol were prepared:

(i) Into a beaker equipped with a frame-type agitator rotating at a velocity of 100 rpm, 400 g water were introduced; said water being city or tap water having a hardness of 25° HT (100 mg/ $Ca^{++}$ ions);

(ii) The powdered composition was rapidly poured therein in the desired amount, with the extent of the addition being less than 30 sec; and (iii) The agitation was maintained until a constant viscosity resulted.

It should be noted that the solution test was made more difficult by reason of the mild conditions of agitation, thereby making it possible to observe the improvement in dispersibility; higher degrees of agitation would not be beneficial.

The agitator employed was a frame blade placed in the solution such that the upper part thereof was flush with the surface of the water, thereby aiding the wetting of the surface of the powder poured onto the water.

The following examples illustrate the different compositions of the invention which contain a surfactant. The properties of the sols obtained with the compositions of the invention are compared with those of sols containing only the water soluble gum.

In all of the examples to follow, the percentages are expressed by weight.

EXAMPLES 1 to 6

Experiments A to F:

The following examples illustrate the use of the noted water soluble natural gums:

(1) Sodium alginate;
(2) Gum arabic;
(3) Gum tragacanth;
(4) Carob gum; and
(5) Pectins (L.M.) and (H.M.).

(A) Preparation of the compositions based upon the natural gums:

The following compositions of the invention containing the aforesaid natural gums and, as the water donor, a light silica precipitate and a sodium diisopropylnaphthalenesulfonate, anionic surfactant were first prepared.

All of the subject compositions were formulated as follows:

(i) 60% of the water soluble gum;
(ii) 11.65% of a silica precipitate (Tixosil 38 A);
(iii) 5% sodium diisopropylnaphthalenesulfone (Supragil WP); and
(iv) 23.35% city water.

The characteristics of the various components are set forth below:

The sodium alginate employed was a purified product extracted from seaweed of the genus Laminoria and marketed under the trademark Aqualgine;

The gum arabic and the gum tragacanth were products marketed by Societe Iranex;

The carob gum was the product sold as Vidogum L. Its molecular weight was 100,000 and its composition was as follows: galactomannanes=75–80% of which 15–20% was galactose and 80–85% mannose; lipids=0-.8–1.2%; proteins=5.3–5.6%; fibrous fraction=0-.8–1.3%; drying loss=12.0–14.0; total ash=0.9–1.3; and The pectins (L.M.) and (H.M.) were products sold by Unipectin, respectively under the designations 325 NH 95 and RS 150° (Rapid Set 150° Sag). The (L.M.) pectins had a degree of esterification of 26 to 36% and the (H.M.) pectins one of 71 to 74%.

Tixosil 38 A is a precipitated silica having a BET surface of 250 $m^2/g$ and a pore volume, of those pores varying from 400 Å to 2.5μ, of 1.80 $cm^3/g$ of silica, and a moisture content of less than 7% at 105° C.

Supragil WP is a sodium diisopropylnaphthalenesulfonate, an anionic surfactant in the solid state. More precisely, it has the formula $(C_3H_7)_{no}C_{10}H_{7-no}SO_3Na$, with no=1.8.

The preparation of the subject compositions was carried out under the above-outlined conditions.

(B) Preparation of the sols:

The sols were prepared from the aforesaid compositions, with a constant gum content of 1%.

A series of control experiments was also carried out wherein only a water soluble gum was utilized (Experiments A to F).

The operating conditions for the preparation of the sols were also as above-outlined.

(C) Viscosity measurements:

The viscosity of the sols prepared from the compositions of the invention and the various water soluble gums was measured.

Viscosity measurements were taken at 23° C. with the aid of a Brookfield Model RV viscosimeter, and at a velocity of 10 rpm with a plunger No. 1.

Measurements were recorded after 10, 30 and 60 min of agitation.

The results obtained are reported in Table I for the compositions of the invention, and in Table II for the gums alone.

A comparative analysis of Tables I and II evidences that the use of natural gums in the form of the compositions of the invention markedly improves, in all instances, the dispersion of the gum in the aqueous medium and has a positive effect on the speed of dissolution of carob gum and a slight effect on the pectins.

TABLE I

Measurements of viscosities in mPa.s (BROOKFIELD Model RV Viscosimeter - 10 rpm - Plunger No. 1)
Appearance of the solutions

| REFERENCES | EXAMPLE 1 | EXAMPLE 2 | EXAMPLE 3 | EXAMPLE 4 | EXAMPLE 5 | EXAMPLE 6 |
|---|---|---|---|---|---|---|
| Nature of the gum | Sodium alginate | Gum arabic | Gum tragacanth | Carob gum | Pectin (L.M.) | Pectin (H.M.) |
| Duration of agitation: | | | | | | |
| 10 minutes | not measurable | 5 | 34 | 105 | 40 | 40 |
| 30 minutes | 10 | 5 | 30 | 207 | 40 | 45 |
| 60 minutes | 10 | 5 | 32.5 | 275 | 40 | 45 |
| Observations | Good dispersion, wets well. Dissolution in approximately | Ready dispersion. Total dissolution in 6–8 | Ready dispersion, good wettability. Dissolution in 15 min. | Good dispersion, wets well, some floccules. Very long disso- | Very good dispersion, wets well. Dissolution in | Very good dispersion, small floccules. Dissolution in |

TABLE I-continued

Measurements of viscosities in mPa.s (BROOKFIELD Model RV Viscosimeter - 10 rpm - Plunger No. 1)
Appearance of the solutions

| REFERENCES | EXAMPLE 1 | EXAMPLE 2 | EXAMPLE 3 | EXAMPLE 4 | EXAMPLE 5 | EXAMPLE 6 |
|---|---|---|---|---|---|---|
| | 15-20 min. Opaque yellow-brown solution. | min. | Opaque solution. | lution period. Opaque solution. | 10 min. Opaque yellow solution. | 60 min. Yellow solution. |

TABLE II

Measurements of viscosities in mPa.s (BROOKFIELD Model RV Viscosimeter - 10 rpm - Plunger No. 1)
Appearance of the solutions

| REFERENCES | EXPERIMENT A | EXPERIMENT B | EXPERIMENT C | EXPERIMENT D | EXPERIMENT E | EXPERIMENT F |
|---|---|---|---|---|---|---|
| Nature of the gum | Sodium alginate | Gum arabic | Gum tragacanth | Carob gum | Pectin (L.M.) | Pectin (H.M.) |
| Duration of agitation: | | | | | | |
| 10 minutes | not measurable | 0 | | 90 | | |
| 30 minutes | 10 | 0 | 38 | 180 | 30 | 38 |
| 60 minutes | 10 | 0 | | 270 | 32.5 | 46 |
| Observations | Good dispersion, wets well. Dissolution in approximately 20-30 min. Clear, transparent, yellow-brown solution. | Difficult dispersion, remains on surface, wets very poorly. | Difficult dispersion, wets poorly. Dissolution in 60 min. | Good dispersion, wets well, some floccules. Dissolution very long, after 24 h the viscosity is still increasing. Opaque solution. | Very poor dispersion, no wetting at all, stirring with a spatula required. Dissolution in 30 min, when powder is wetted. | Very poor dispersion, poor wetting, mixing with spatula. Coarse floccules. Dissolution in 60 min, when powder is wetted. |

EXAMPLES 7 AND 8

Experiments G and H:

In the following examples, the water soluble synthetic polymers were employed: one was of cationic type, a homopolymer of ethyltrimethylammonium methacrylate chloride (Flocogil C4); the other was of anionic type, a copolymer of acrylic acid and acrylamide (Flocogil AD 37).

(A) Preparation of the compositions based upon the synthetic polymers:

The two polymers were formulated into the subject compositions under same conditions as the natural gums.

Their characteristics were as follows:

Flocogil C4 is a highly cationic, high molecular weight polymer in the form of a fine, white powder. It was prepared by the process described in French Patent No. 2,348,227.

Flocogil AD 37 is a moderately anionic polymer of high molecular weight, i.e., $6-8 \times 10^6$; it was present in the form of a fine, white powder, and also was prepared by the process described in French Patent No. 2,348,227.

(B) Preparation of the sols:

The sols were prepared in a manner identical to that of the preceding examples from the compositions of the invention, employing a polymer content by weight of 0.5% for the homopolymer of ethyltrimethylammonium methacrylate chloride, and 1% for the copolymer of acrylic acid and acrylamide.

For purposes of comparison, sols containing only the water soluble synthetic polymers were also prepared.

(C) Viscosity measurements:

The viscosity of the several sols was measured after 5, 15, 30 and 60 min utilizing a BROOKFIELD Model RV viscosimeter at a velocity of 10 rpm and with a plunger No. 2.

The results obtained with the compositions of the invention are reported in Table III and those with the control experiments in Table IV.

TABLE III

Measurements of viscosities in mPa.s (BROOKFIELD Model RV Viscosimeter - 10 rpm - Plunger No. 2)
Appearance of the solutions

| REFERENCES | EXAMPLE 7 | EXAMPLE 8 |
|---|---|---|
| Nature of the gum | Homopolymer of ethyltrimethylammonium methacrylate chloride | Copolymer of acrylic acid and acrylamide |
| Duration of agitation: | | |
| 5 minutes | 820 | 1660 |
| 15 minutes | 960 | 2220 |
| 30 minutes | | 2200 |
| 60 minutes | 720 | 1960 |
| Observations | Very good dispersion. Dissolution in 5 min. White opaque solution. | Very good dissolution. Dissolution in 15 min. Opaque solution. |

TABLE IV

Measurements of viscosities in mPa.s (BROOKFIELD Model RV Viscosimeter - 10 rpm - Plunger No. 2)
Appearance of the solutions

| REFERENCES | EXPERIMENT G | EXPERIMENT H |
|---|---|---|
| Nature of the gum | Homopolymer of ethyltrimethylammonium methacrylate chloride | Copolymer of acrylic acid and acrylamide |
| Duration of agitation: | | |
| 5 minutes | 80 | |
| 15 minutes | 290 | |
| 30 minutes | 300 | 780 |
| 60 minutes | | 960 |
| Observa- | Very poor dispersion. | Very poor dispersion. the |

TABLE IV-continued

Measurements of viscosities in mPa.s (BROOKFIELD Model RV Viscosimeter - 10 rpm - Plunger No. 2)
Appearance of the solutions

| REFERENCES | EXPERIMENT G | EXPERIMENT H |
|---|---|---|
| tions | the product remains on the surface. Dissolution in 45 min. Clear limpid solution. | product remains on the surface. Dissolution in 30 min. after setting. |

It will be seen from the Tables III and IV that marked improvement in the dispersion of the synthetic gums and an increase in the dissolution thereof result when same are formulated according to the invention.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter adapted for ready dispersion/dissolution in an aqueous medium, comprising intimate admixture of a water soluble gum or polymer, and a dispersion/dissolution enhancing amount of a water donor material therefore, the amount of water being such that the ratio by weight of the gum or polymer thereto ranges from 6.5 to 1, and the ratio by weight of the water donor to the water therein ranges from 0.3 to 2.6.

2. The composition of matter as defined by claim 1, said water soluble gum or polymer comprising a natural gum, a modified natural gum, a synthetic polymer, or admixture thereof.

3. The composition of matter as defined by claim 2, said water soluble gum or polymer comprising at least one of the natural gums, agar-agar, an alginate, a carrageenate, gum arabic, gum tragacanth, carob gum, guar gum, pectin or gelatin.

4. The composition of matter as defined by claim 2, said water soluble gum or polymer comprising a cellulosic.

5. The composition of matter as defined by claim 4, said cellulosic comprising methylcellulose, ethylcellulose, hydroxyethylcellulose, hydroxypropylcellulose, ethylhydroxyethylcellulose, sodium carboxymethylcellulose, or sodium carboxymethylhydroxyethylcellulose.

6. The composition of matter as defined by claim 2, said water soluble gum or polymer comprising at least one of the water soluble synthetic polymers, a polyvinyl alcohol, a polyvinylpyrrolidone, a polyvinyl methyl ether, a polyacrylic or polymethacrylic acid, or salt or ester thereof, a polyacrylamide or polymethacrylamide, a polyalkylene oxide, or water soluble derivative thereof.

7. The composition of matter as defined by claim 2, said water soluble gum or polymer comprising at least one polymer or copolymer of acrylamide, methacrylamide, acrylonitrile, methacrylonitrile, acrylic acid or methacrylic acid, or salt or ester thereof, or optionally quaternized aminoalkyl acrylate or methacrylate.

8. The composition of matter as defined by claim 2, said water donor comprising a finely divided silica, a hydrated silica gel, a dehydrated silica gel, an alumina hydrate, an argilla, a natural or synthetic zeolite, or a hydrate of an inorganic or organic salt.

9. The composition of matter as defined by claim 2, said water donor comprising a finely divided silica having a BET surface of 200 to 400 m²/g and a particle diameter ranging from 200 to 800 Å, or a hydrate of at least one sodium, potassium, calcium or magnesium carbonate, halide, nitrate, phosphate, silicate, sulfate, acetate, citrate, lactate, laurate or tartrate, or mixture thereof.

10. The composition of matter as defined by claim 2, said water donor comprising a finely divided silica capable of sorbing 2 to 3 times its weight of water.

11. The composition of matter as defined by claim 2, further comprising an anionic or nonionic surfactant, or mixture thereof.

12. The composition of matter as defined by claim 11, said surfactant comprising an alkali metal soap, an alkali sulfonate, a sulfate or sulfated compound, an alkaline phosphate, a polyoxyalkylene alkylphenol, an aliphatic polyoxyalkylene alcohol, a fatty amide, or a polyoxyethylene or polyoxypropylene compound, or mixture thereof.

13. The composition of matter as defined by claim 12, said surfactant comprising a sodium alkylsulfosuccinate, a sodium alkylnaphthalene sulfonate, or a sulfonated olefin.

14. The composition of matter as defined by claim 13, said surfactant comprising sodium diisopropylnaphthalene sulfonate.

15. The composition of matter as defined by claim 11, wherein the ratio by weight of the surfactant thereto is no greater than 0.10.

16. The composition of matter as defined by claim 2, said water donor comprising bound water.

17. The composition of matter as defined by claim 2, said water donor comprising water of crystallization.

18. The composition of matter as defined by claim 2, said water donor comprising sorbed water.

19. The composition of matter as defined by claim 2, said water donor adapted to sorb and retain water from an external aqueous medium.

20. The composition of matter as defined by claim 2, comprising a free-flowing powder.

21. The composition of matter as defined by claim 2, comprising from 30 to 70% by weight of the water soluble gum or polymer; from 7 to 40% by weight of the water donor; from 0 to 10% by weight of an anionic or nonionic surfactant, or mixture thereof; and from 15 to 37% by weight of water.

22. The composition of matter as defined by claim 21, comprising from 50 to 60% by weight of the water soluble gum or polymer; from 8 to 15% by weight of the water donor; from 3 to 7% by weight of the surfactant; and from 24 to 36% by weight of water.

23. A composition of matter adapted for ready dispersion/dissolution in an aqueous medium, comprising intimate admixture of a water soluble gum or polymer, and a dispersion/dissolution enhancing amount of a water donor material therefor comprising a finely divided silica having a BET surface of 200 to 400 m²/g and a particle diameter ranging from 200 to 800 Å or a hydrate of at least one sodium, potassium, calcium or magnesium carbonate, halide, nitrate, phosphate, silicate, sulfate, acetate, citrate, laurate or tartrate, or mixture thereof, the amount of water being such that the ratio by weight of the gum or polymer thereto ranges from 6.5 to 1, and the ratio by weight of the water donor to the water therein ranges from 0.3 to 2.6.

24. A sol comprising dispersion/solution of the composition of matter as defined by claim 1, in an aqueous medium.

25. The sol as defined by claim 24, comprising from 0.3 to 10% by weight of said water soluble gum or polymer.

* * * * *